(12) United States Patent
Sugihara et al.

(10) Patent No.: US 6,177,530 B1
(45) Date of Patent: Jan. 23, 2001

(54) ANTIFOULING PAINT COMPOSITION

(75) Inventors: Mitsunori Sugihara; Kazuhiko Hotta; Masamitsu Ito, all of Nagoya (JP)

(73) Assignee: Mitsubishi Rayon Co., Ltd., Tokyo (JP)

( * ) Notice: Under 35 U.S.C. 154(b), the term of this patent shall be extended for 0 days.

(21) Appl. No.: 09/432,182

(22) Filed: Nov. 2, 1999

Related U.S. Application Data

(63) Continuation of application No. PCT/JP98/02155, filed on May 15, 1998.

(30) Foreign Application Priority Data

May 20, 1997 (JP) .................................................... 9-129850

(51) Int. Cl.$^7$ ................................................. C08F 130/04
(52) U.S. Cl. ..................... 526/241; 526/292.1; 526/295; 526/318.4; 526/318.44; 526/328.5; 526/329.4
(58) Field of Search ................................ 526/241, 292.1, 526/295, 318.4, 318.44, 328.5, 329.4

(56) References Cited

U.S. PATENT DOCUMENTS 4,835,231  *  5/1989  Yamamori et al. ..................... 526/40

FOREIGN PATENT DOCUMENTS

| 2 320 251 | * | 6/1998 | (GB) . |
|---|---|---|---|
| 55-164261 | | 12/1980 | (JP) . |
| 60-144373 | | 7/1985 | (JP) . |
| 63-56510 | | 3/1988 | (JP) . |
| 10-101969 | | 4/1998 | (JP) . |
| 10-158547 | | 6/1998 | (JP) . |

* cited by examiner

*Primary Examiner*—Helen L. Pezzuto
(74) *Attorney, Agent, or Firm*—Pillsbury Madison & Sutro LLP

(57) ABSTRACT

An antifouling paint composition comprising, as a vehicle, a copolymer from a monomer mixture comprising of ($a_1$) a metal-containing polymerizable monomer having two unsaturated groups and ($a_2$) a metal-containing polymerizable monomer represented by the following formula (I):

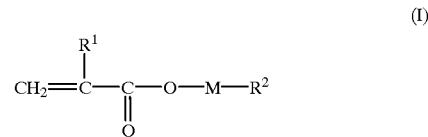

(I)

wherein $R^1$ represents a hydrogen atom or a methyl group; M represents Mg, Zn or Cu; and $R^2$ represents an organic acid residue. An antifouling paint composition comprising, as a vehicle, a copolymer from a monomer mixture comprising (a) a metal-containing polymerizable monomer and (b) a polymerizable monomer represented by the following formula (II):

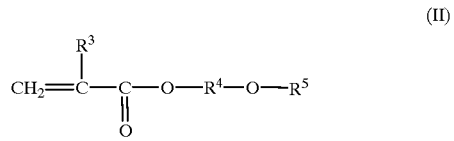

(II)

wherein $R^3$ reprsents a hydrogen atom or a methyl group; $R^4$ represents an alkyl group having 1 to 10 carbon atoms, a cycloalkyl group or a phenyl group; and $R^5$ represents an alkyl having 1 to 10 carbon atoms, a cycloalkyl group or a phenyl group.

5 Claims, No Drawings

ANTIFOULING PAINT COMPOSITION

This is a continuation application of PCT international application No. PCT/JP98/02155, filed May 15, 1998.

TECHNICAL FIELD

The present invention relates to an antifouling paint composition. More particularly, it relates to an antifouling paint composition which is capable of inhibiting attachment and accumulation of marine organisms and seaweeds on the underwater structures, fishing nets and the ship bottom.

BACKGROUND ART

The submerged portions of the ships and marine structures are provided with an antifouling coating containing rosin or organic tin for the purpose of preventing corrosion or the drop of cruising speed of the ships due to attachment of marine creatures such as barnacles, teredos, and algae. Such an antifouling coating is also provided on the nets used at the nurseries of fishes or marine products for the purpose of preventing fatal effect on the reared fishes and shellfishes by the attachment of marine organisms on the nets.

The antifouling effect of these antifouling coatings is demonstrated as the rosin and antifouling substance(s) contained in the coating are eluted into seawater. Therefore, when the coating is left immersed in seawater for a long period of time, the eluting substance is gradually decreased while the non-eluting matter is left in the coating, and at the same time the coating surface becomes jagged, which tends to excessively reduce the effect of the coating to prevent attachment and accumulation of marine organisms. In the case of organotin-containing self polishing type paint, the coating surface is gradually dissolved away to constantly renew the surface so that the antifouling substance will be always kept exposed on the coating surface to allow long-time retention of its antifouling effect. This type of antifouling paint, however, has a possibility to give baneful influence to fishes and shellfishes because of strong toxicity of organic tin contained therein. Thus, request is intensifying in the industry for the development of a self polishing type antifouling paint composition which is low in toxicity and capable of exhibiting its antifouling effect in the sea for a prolonged period of time. Many studies have been made on the self polishing type paints free of organic tin. For example, JP-A-62-57464 and JP-A-62-84168 describe the antifouling paint compositions using the copolymers having a metal-containing group at the end of the side chain. Also, JP-A-5-171066 discloses an antifouling paint composition containing a copolymer comprising a metal-containing monomer having 2 to 3 double bonds, as a vehicle.

However, the antifouling paints using metal-containing copolymers such as described in JP-A-62-57464 and JP-A-62-84168 mentioned above are reduced in their self polishing action with time, so that their antifouling effect can hardly last for a long period of time. If the metal content per polymer molecular weight is increased for improving the self polishing characteristics of these antifouling paints, the formed coating becomes hard and frail and tends to develop cracks or exfoliate.

On the other hand, the antifouling paint using a copolymer such as described in JP-A-5-171066, although capable of maintaining its self polishing action for a long period of time tends to have an insufficient rate of consumption of the coating, hence is not necessarily satisfactory in long-time antifouling effect of coating. Also, the foamed coating tends to become hard and fragil with the lapse of time, and further this type of paint is unsatisfactory in its recoatability on the old coating formed from an organotin-based paint and so on, so that the recoating film tends to crack or exfoliate.

DISCLOSURE OF THE INVENTION

An object of the present invention is to provide a self polishing type antifouling paint composition which is capable of displaying an excellent antifouling effect in seawater for a prolonged period of time and also shows excellent crack resistance and recoating properties on the old coating formed from an organotin-based paint and so on.

As a result of extensive studies on the subject matter, the present inventors found that an antifouling paint containing as vehicle a metal-containing copolymer consisting of specific polymerizable monomers is capable of maintianing an excellent antifouling effect in seawater for a long period of time and also has excellent recoatability on the old coating formed from an organotin-based paint and so on.

The present invention provides an antifouling paint composition containing as vehicle a copolymer from a mixture of ($a_1$) a metal-containing polymerizable monomer having two unsaturated groups and ($a_2$) a metal-containing monomer represented by the following formula (I):

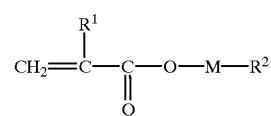

(I)

wherein $R^1$ represents a hydrogen atom or a methyl group; M represents Mg, Zn or Cu; and $R^2$ represents an organic acid residue.

The present invention also provide an antifouling paint composition containing as vehicle a copolymer from a mixture of (a) a metal-containing polymerizable monomer and (b) a polymerizable monomer represented by the following formula (II):

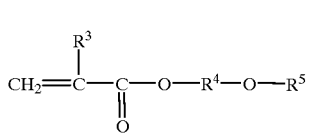

(II)

wherein $R^3$ represents a hydrogen atom or a methyl group; $R^4$ represents an alkyl group having 1 to 10 carbon atoms, a cycloalkyl group or a phenyl group; and $R^5$ represents an alkyl group having 1 to 10 carbon atoms, a cycloalkyl group or a phenyl group.

BEST MODE FOR CARRYING OUT THE INVENTION

The metal-containing polymerizable monomer (a) used as a constituent of the copolymer serving as a vehicle in the present invention is a substance which can afford a long-lasting high self polishing characteristics to the formed coating and also shows an excellent antifouling effect. Preferably, it is selected from the metal-containing polymerizable monomers ($a_1$) having two unsatuated groups or the metal-containing polymerizable monomers ($a_2$) represented by the formula (I) shown above.

Examples of the metal-containing polymerizable monomers ($a_1$) having two unsaturated groups usable in the present invention include magnesium acrylate [$(CH_2=CHCOO)_2Mg$], magnesium methacrylate [$CH_2=C(CH_3)COO]_2$ Mg], zinc acrylate [$(CH_2=CHCOO)_2Zn$], zinc methacrylate [$(CH_2=C(CH_3)COO)_2Zn$], copper acrylate [$(CH_2=CHCOO)_2Cu$], and copper methacrylate [$(CH_2=C(CH)COO_2Cu$]. These metal-containing polymerizable monomers ($a_1$) may be used either singly or as a mixture of two or more of them as required. Zinc (meth)acrylate is especially preferred. When the term "(meth)acrylate" is used in the present specification, it means "acrylate or methacrylate".

The metal-containing polymerizable monomers ($a_2$) usable in the present invention are those represented by the above-shown formula (I). In the formula (I), $R^1$ represents a hydrogen atom or a methyl group; M represents Mg, Zn or Cu as a metal; and $R^2$ represents an organic acid residue. The organic acid residues include, for instance, those derived from monovalent organic acids such as monochloroacetic acid, monofluoroacetic acid, propionic acid, octylic acid, versatic acid, isostearic acid, palmitic acid, cresotinic acid, α-naphthoic acid, β-naphthoic acid, benzoic acid, 2,4,5-trichlorophenoxyacetic acid, 2,4-dichlorophenoxyacetic acid, quinolinecarboxylic acid, nitrobenzoic acid, nitronaphthalenecarboxylic acid and pulvinic acid. Of these organic acid residues, the fatty acid type is especially preferred for the antifouling paints and can provide a coating which can stay free of cracks or exfoliation for a long period of time.

Examples of the metal-containing polymerizable monomers ($a_2$) represented by the above formula (I) include, for example, magnesium monochloroacetate (meth)acrylate ((meth)acrylate meaning acrylate or methacrylate in the specification) zinc monochloroacetate (meth)acrylate, copper monochloroacetate (meth)acrylate, magnesium monofluoroacetate (meth)acrylate, zinc monofluoroacetate (meth)acrylate, copper monofluoroacetate (meth)acrylate, magnesium propionate (meth)acrylate, zinc propionate (meth)acrylate, copper propionate (meth)acrylate, magnesium octylate (meth)acrylate, zinc octylate (meth)acrylate, copper octylate (meth)acrylate, magnesium versatate (meth)acrylate, zinc versatate (meth)acrylate, copper versatate (meth)acrylate, magnesium palmitate (meth)acrylate, zinc palmitate (meth)acrylate, copper palmitate (meth)acrylate, magnesium cresotinate (meth)acrylate, zinc cresotinate (meth)acrylate, copper cresotinate (meth)acrylate, magnesium α-naphthoate (meth)acrylate, zinc α-naphthoate (meth)acrylate, copper α-naphthoate (meth)acrylate, magnesium β-naphthoate (meth)acrylate, zinc β-naphthoate (meth)acrylate, copper β-naphthoate (meth)acrylate, magnesium benzoate (meth)acrylate, zinc benzoate (meth)acrylate, copper benzoate (meth)acrylate, magnesium 2,4,5-trichloroacetate (meth)acrylate, zinc 2,4,5-trichlorophenoxyacetate (meth)acrylate, copper 2,4,5-trichlorophenoxyacetate (meth)acrylate, magnesium 2,4-dichlorophenoxyacetate (meth)acrylate, zinc 2,4-dichlorophenoxyacetate (meth)acrylate, copper 2,4-dichlorphenoxyacetate (meth)acrylate, magnesium quinolinecarboxylate (meth)acrylate, zinc quinolinecarboxylate (meth)acrylate, copper quinolinecarboxylate (meth)acrylate, magnesium nitrobenzoate (meth)acrylate, zinc nitrobenzoate (meth)acrylate, copper nitrobenzoate (meth)acrylate, magnesium nitronaphthalenecarboxylate (meth)acrylate, zinc nitronaphthalenecarboxylate (meth)acrylate, copper nitronaphthalenecarboxylate (meth)acrylate, magnesium pulvinate (meth)acrylate, zinc pulvinate (meth)acrylate, and copper pulvinate (meth)acrylate. These metal-containing polymerizable monomers ($a_2$) may be used either singly or as a mixture of two or more of them as required. Zinc-containing polymerizable monomers are especially preferred.

Combined use of a metal-containing polymerizable monomer ($a_1$) having two unsaturated groups and a metal-containing polymerizable monomer ($a_2$) represented by the formula (I) as the metal-containing polymerizable monomer (a) is preferred as the self polishing of the formed coating are maintained for a long time and a sufficient rate of consumption of the coating is exhibited. The combination of zinc (meth)acrylate and fatty acid type zinc (meth)acrylate is especially preferred.

The composition of the metal-containing polymerizable monomer (a) in the copolymer used as a vehicle in the present invention is not subject to any specific restrictions, but preferably it is within the range of 10 to 80% by weight. A composition of 10% by weight or more of said monomer (a) tends to afford a pertinent self polishing characteristics to the formed coating, while the antifouling properties of the coating tend to be maintained for a long period of time when said composition is made 80% by weight or less. The more preferred range of said composition is from 20 to 50% by weight.

In case a metal-containing polymerizable monomer ($a_1$) having two unsaturated groups and a metal-containing polymerizable monomer ($a_2$) represented by the formula (I) are used as the metal-containing polymerizable monomer (a) which is a constituent of the vehicle-forming copolymer, the ratio (mol %) of ($a_1$) units/($a_2$) units in the copolymer preferably falls within the range from 20/80 to 80/20. This is for the reason that the ratio of 80/20 or below tends to provide a satisfactory self polishing characteristics, while the ratio of 20/80 or above tends to enable the formed coating to maintain its self polishing characteristics for a long period of time. The more preferred range of said ratio is from 30/70 to 70/30.

The polymerizable monomer (b) used as another constituent of the vehicle copolymer is the one represented by the formula (II) and can afford excellent rate of consumption and long-time self polishing characteristics, as well as excellent crack resistance and peel resistance, to the formed coating by being combined with the above (a) component. Particularly, when the above ($a_1$) component is combined with the above (b) component, the rate of consumption of the coating can be more enhanced as compared with the use of the ($a_1$) component alone. Also, when the above ($a_2$) component is combined with the above (b) component, the long-time self polishing characteristics of the coating can be more improved as compared with the use of the ($a_2$) component alone.

Examples of the polymerizable monomers (b) include 2-methoxyethyl (meth)acrylate, 2-ethoxyethyl (meth)acrylate, phenoxyethyl (meth)acrylate, 2-(2-ethylhexaoxy)ethyl (meth)acrylate, 1-methyl-2-methoxyethyl acrylate, 3-methoxybutyl acrylate, 3-methyl-3-methoxybutyl acrylate, m-methoxyphenyl (meth)acrylate, p-methoxyphenyl (meth)acrylate, o-methoxyphenylethyl (meth)acrylate, m-methoxyphenylethyl (meth)acrylate, and p-methoxyphenylethyl (meth)acrylate. These monomers may be used either singly or as a mixture of two or more of them as required. Of these monomers, 2-methoxyethyl acrylate and 3-methoxybutyl acrylate are preferred.

No specific restrictions are imposed on the composition of the polymerizable monomer (b) in the vehicle copolymer used in the present invention, but the composition preferably falls within the range from 1 to 90% by weight. When the composition is set to be 1% by weight or above, the formed coating tends to improve in flexibility and crack and peel resistance, while a composition of 90% by weight or below of said monomer (b) tends to make better the balance between crack and peel resistance of the formed coating and its long-time self polishing characteristics. The more preferred range of said composition is from 5 to 60% by weight, even more preferably from 10 to 50% by weight.

If necessary, there can be used an unsaturated monomer (c) copolymerizable with said monomer ($a_1$), ($a_2$) or (b) as still another constituent of the copolymer used as vehicle in the present invention. The monomer (c) used in the present invention is not subject to any specific restrictions as far as it is copolymerizable with said monomer ($a_1$), ($a_2$) or (b). As such monomer (c), there can be used, for instance, (meth) acrylic acid ester nibiners such as methyl (meth)acrylate, ethyl (meth)acrylate, n-propyl (meth)acrylate, i-propyl (meth)acrylate, n-butyl (meth)acrylate, i-butyl (meth) acrylate, t-butyl (meth)acrylate, 2-ethylhexyl (meth) acrylate, lauryl (meth)acrylate, stearyl (meth)acrylate, benzyl (meth)acrylate, phenyl (meth)acrylate, isobonyl (meth) acrylate, cyclohexyl (meth)acrylate, and glycidyl (meth) acrylate; hydroxyl group-containing monomers such as 2-hydroxyethyl (meth)acrylate, 2-hydroxypropyl (meth) acrylate, 3-hydroxypropyl (meth)acrylatte, 2-hydroxybutyl (meth)acrylate and 4-hydroxybutyl (meth)acrylate; adducts of 2-hydroxyethyl (meth)acrylate with ethylene oxide, propylene oxide, à-butyrolactone or à-caprolactone; dimers or trimers such as 2-hydroxyethyl (meth)acrylate and 2-hydroxypropyl (meth)acrylate; monomers having plural hydroxyl groups such as glycerol (meth)acrylate; vinyl monomers containing primary and secondary amino groups such as butylaminoethyl (meth)acrylate and (meth) acrylamide; vinyl monomers containing tertiary amino groups such as dimethylaminoethyl (meth)acrylate, diethylaminoethyl (meth)acrylate, dimethylaminopropyl (meth) acrylate, dimethylaminobutyl (meth)acrylate, dibutylaminoethyl (meth)acrylate, dimethylaminoethyl (meth)acrylate, and dimethylaminopropyl (meth)acrylate; heterocyclic basic monomers such as vinylpyrrolidone, vinylpyridine, and vinycarbazole; and vinyl monomers such as styrene, vinyltoluene, à-methylstyrene, (meth)acrylonitrile, vinyl acetate and vinyl propionate. These monomers may be used either singly or as a mixture of two or more of them.

The composition of the unsaturated monomer (c) in the copolymer as a vehicle copolymer used in the present invention is not specifically defined, but it is preferably in the range from 0 to 89% by weight for the reason that by defining the composition to be 89% by weight or below, the formed coating is provided with favorable hydrolyzing properties and tends to be made better in balance between the long-time self polishing characteristics and crack and peel resistance. The more preferred range of said composition is from 7 to 75% by weight, even more preferably from 10 to 60% by weight.

The preparation process for the copolymer used as vehicle in the present invention is not specified; it can, for instance, be produced from a process which comprises mixing said monomers and reacting this mixture in the presence of a radical polymerization initiator at 60 to 180° C. for 5 to 14 hours. As the polymerization method, there can be employed solution polymerization in which the reaction is carried out in an organic solvent, as well as other methods such as emulsion polymerization and suspension polymerization, but employment of solution polymerization using an ordinary organic solvent such as toluene, xylene, methyl isobutyl ketone, n-butyl acetate or the like is advantageous in terms of productivity and product performance.

The copolymer serving as a vehicle in the antifouling paint composition of the present invention is preferably used in a ratio of usually 20 to 25% by weight (solids) as resin component in the composition. This is based on the fact that the presence of the resin component in a proper content is conducive to the improvement of coating properties such as crack resistance and also makes it easier to contain a sufficient amount of the antifouling toxicant in the antifouling paint composition to let it maintain high antifouling performance.

The antifouling paint composition of the present invention comprises said copolymer as vehicle, so that the formed coating can hold antifouling performance. The antifouling performance can be further enhanced by containing an antifouling toxicant.

The antifouling toxicant used in the antifouling paint composition of the present invention can be properly selected according to the product performance requirement. There can be used, for instance, coppery antifouling toxicant such as cuprous oxide, copper thiocyanate and copper powder, compounds of other metals such as lead, zinc, nickel, etc., amine derivatives such as diphenylamine, nitrile compounds, benzothiazole compounds, maleimide compounds, pyridine compounds, and the like. These substances may be used either singly or as a mixture of two or more of them.

In the antifouling paint composition of the present invention, it is also possible to blend a silicon compound such as dimethyl polysiloxane or silicone oil or a fluorine-containing compound such as carbon fluoride for the purpose of imparting lubricity to the coating surface to prevent attachment of organisms. It is further possible to blend where necessary an extender pigment, color pigment, plasticizer, various types of paint additives, other resins, etc., in the composition of the present invention.

For forming a coating by using the antifouling paint composition of the present invention, said composition is coated either directly or after applying a primer coat with a washer primer, chlorinated rubber or epoxy primer, or an intercoat, on the surface of a base such as ship, fishing net, or underwater structure such as port facility, oil fence, bridge, submarine infrastructure, etc., by a means such as brush coating, spray coating, roller coating, deposition coating, etc. The amount of coating of the composition is usually such as will provide a coating thickness of 50 to 400 $\mu$m as dry film. Drying of the coat is usually conducted at room temperature, but it may be performed under heating.

The present invention is further illustrated by the following examples and comparative examples, but the present invention is not restricted by these examples in any way. In the following Examples and Comparative Examples, all "parts" are by weight unless otherwise noted.

EXAMPLES 1–13 AND COMPARATIVE EXAMPLES 1–4

Thirty parts of propylene glycol methyl ether (PGM) and 40 parts of xylene were supplied into a four-necked flask provided with a condenser, a thermometer, a dropping funnel and a stirrer, and heated to 100° C. with stirring. Then a mixture of the monomers and polymerization initiator shown in Table 1 was added dropwise from the dropping funnel at a constant rate over a period of 3 hours. After completion of the dropwise addition, one part of t-butyl peroctoate and 10 parts of xylene were further added dropwise over a period of 2 hours, followed by 2-hour stirring and succeeding addition of 20 parts of xylene to obtain the vehicle copolymer solutions A1–A13 and B1–B4 having the property values shown in Table 1.

Using the thus obtained copolymer solutions A1–A13, there were prepared the antifouling paint compositions (Examples 1–13) according to the formulations shown in Table 2. Also, using the copolymer solutions B1–B4, there were prepared the antifouling paint compositions of Comparative Examples 1–4 according to the formulations shown in Table 2. Further, using a tributyltin methacrylate/methyl methacrylate copolymer solution C1 (solid content: 50%; tin content in solids: 20%; solvent: xylene), there was prepared an antifouling paint composition of Referential Example 1 according to the formulation shown in Table 2.

The above antifouling paint compositions were then subjected to a coating consumption test, an antifouling test and a crack and peel test in the following ways.

(1) Coating Consumption Test

Each of the antifouling paint compositions was applied on a 50×50×2 mm thick hard vinyl chloride plate to a dry coating thickness of 240 μm, and the coated plate was secured to a submerged rotary drum. The drum was rotated at a peripheral speed of 15 knots, and the consumed coating thickness on the plate secured to the drum was measured every three months. The results are shown in Table 3.

(2) Antifouling Test

Each of the antifouling paint compositions was applied on a sandblasted and antirust-coated steel plate to a dry coating thickness of 240 μm to make a test plate. The test plate was kept stationarily immersed in seawater in Hiroshima Bay, Hiroshima Prefecture, for 36 months, and the area (%) of the plate incrusted with extraneous matter was examined every six months. The results are shown in Table 4.

(3) Crack and Peel Test

Each of the antifouling paint compositions of Examples 1–13 and Comparative Examples 1–4 was applied on the following bases (1), (2) and (3) to a dry coating thickness of 240 μm to make the test plates (A), (B) and (C). The test plate (C) has been coated with the same antifouling paint as used in making the base (3).

Base (1): A sandblasted steel plate with antirust coating.

Base (2): A 240 μm thick coating of the antifouling paint composition of Referential Example 1 was formed on the base (1), and this was immersed in sterized and filtered seawater for three months and then dried at room temperature for one week.

Base (3): A 240 μm thick coating of each of the antifouling paint compositions of Examples 1–13 and Comparative Examples 1–4 was formed on the base (1), and this was immersed in sterilized and filtered seawater for three months and then dried at room temperature for one week.

The test plates (A), (B) and (C) were immersed in sterilized and filtered seawater for 12 months. They were taken out of seawater every 6 months and dried at room temperature (20° C.) for one week, and the condition of cracking and peeling of the coating was observed. The condition was indicated by ⊚ when the coating was free of cracks and peeling; ○ when the coating was partly cracked; Δ when the coating was partly peeled: and X when the coating was cracked and peeled allover. The results are shown in Table 5.

In the case of the antifouling paint compositions of Comparative Examples 1–4, although some of them showed self polishing characteristics for a prolonged period of time, these compositions had a tendency to deteriorate in recoatability on the old coating of an organotin-containing coating, etc. Also, the coatings formed with these compositions were cracked and peeled. In contrast, the antifouling paint compositions of the present invention (Examples 1–13) using the copolymers A1–A12 showed long-time self polishing characteristics and excellent antifouling performance, and had good recoatability on the old coating of an organotin-containing coating etc., and their coatings had high crack and peel resistance.

Industrial Applicability

The coating formed from the antifouling paint composition of the present invention exhibits excellent antifouling effect as it is dissolved into seawater constantly at a pertinent rate and capable of maintaining its self polishing characteristics for a long period of time, and also has excellent recoatability on the old coating such as formed from an organotin-based paint and so on. Thus, the product of the present invention is very beneficial to the industries as an antifouling coating for preventing attachment of marine organisms and seaweeds to submerged structures, fishing nets and the bottom of ship.

TABLE 1

|  |  | A1 | A2 | A3 | A4 | A5 | A6 | A7 | A8 | A9 | A10 | A11 | A12 |
|---|---|---|---|---|---|---|---|---|---|---|---|---|---|
| Metal-containing | Zinc acrylate | 12 | 16 |  | 8 | 12 | 16 |  |  | 6 |  |  |  |
| polymerizable monomers | Zinc methacrylate |  |  |  |  |  |  |  | 12 |  | 6 | 35 |  |
| (a₁) (parts) | Copper acrylate |  |  | 16 |  |  |  |  | 16 |  |  | 40 |  |
| Metal-containing | Zinc versatate acrylate | 18 | 24 |  | 12 | 18 | 24 |  |  | 9 |  |  |  |
| polymerizable monomers | Zinc versatate methacrylate |  |  |  |  |  |  |  | 28 | 9 |  |  | 35 |
| (a₂) (parts) | Zinc isostearate acrylate |  |  |  |  |  |  |  |  |  |  |  |  |
|  | Zinc isostearate methacrylate |  |  |  |  |  |  |  |  |  |  |  |  |
|  | Copper versatate acrylate |  |  |  | 24 |  |  |  |  | 24 |  |  |  |
| Polymerizable monomers | 2-Methoxyethylacrylate |  |  |  |  | 25 | 35 |  |  | 10 | 10 | 10 | 10 |
| (b) (parts) | 3-Methoxybutylacrylate |  |  |  |  |  |  | 40 |  | 40 |  | 30 | 40 | 30 |
|  | 3-Methyl-3-methoxybutyl acrylate |  |  |  |  |  |  |  | 25 |  |  |  |  |
| Unsaturated monomers | Methyl methacrylate | 20 | 10 | 10 | 30 |  | 10 |  |  | 13 |  |  |  |
| (c) (parts) | Ethyl acrylate | 50 | 50 | 50 | 25 | 35 | 10 | 35 | 10 | 47 | 25 | 10 | 25 |

TABLE 1-continued

| Polymerization initiator (parts) | t-Butyl peroctoate | 5 | 4 | 6 | 7 | 3 | 4 | 3 | 7 | 5 | 4 | 4 | 6 |
|---|---|---|---|---|---|---|---|---|---|---|---|---|---|
| Property value | Gardner viscosity (25° C.) | −Z1 | −Z | −Z3 | +Z | +V | −Z1 | +W | +Z1 | +X | −Y | +Z2 | +Z |
| | Heating residue (wt %) | 50.2 | 49.9 | 49.4 | 50.9 | 50.1 | 50.6 | 50.3 | 51.1 | 49.7 | 50.4 | 50.9 | 50.5 |

| | | | A13 | B1 | B2 | B3 | B4 |
|---|---|---|---|---|---|---|---|
| Metal-containing polymerizable monomers ($a_1$) (parts) | Zinc acrylate | | 8 | | | | |
| | Zinc methacrylate | | 8 | 35 | | | |
| | Copper acrylate | | | | | 40 | |
| Metal-containing polymerizable monomers ($a_2$) (parts) | Zinc versatate acrylate | | | | | | |
| | Zinc versatate methacrylate | | | | | | 35 |
| | Zinc isostearate acrylate | | 12 | | | | |
| | Zinc isostearate methacrylate | | 12 | | | | |
| | Copper versatate acrylate | | | | | | |
| Polymerizable monomers (b) (parts) | 2-Methoxyethylacrylate | | 13 | | | | 40 |
| | 3-Methoxybutylacrylate | | | | | | |
| | 3-Methyl-3-methoxybutyl acrylate | | | | | | |
| Unsaturated monomers (c) (parts) | Metyl methacrylate | | 13 | 5 | 10 | 5 | 40 |
| | Ethyl acrylate | | 34 | 60 | 50 | 60 | 20 |
| Polymerization initiator (parts) | t-Butyl peroctoate | | 5 | 3 | 3 | 1.5 | 0.7 |
| Property value | Gardner viscosity (25° C.) | | −Y | +S | +W | +R | +L |
| | Heating residue (wt %) | | 49.7 | 50.3 | 49.3 | 50.2 | 49.8 |

TABLE 2

| | Example | | | | | | | | | | | | | Comparative Example | | | | Referantial Example |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 1 | 2 | 3 | 4 | 1 |
| Copolymer | | | | | | | | | | | | | | | | | | |
| A1 | 40 | | | | | | | | | | | | | | | | | |
| A2 | | 40 | | | | | | | | | | | | | | | | |
| A3 | | | 40 | | | | | | | | | | | | | | | |
| A4 | | | | 40 | | | | | | | | | | | | | | |
| A5 | | | | | 40 | | | | | | | | | | | | | |
| A6 | | | | | | 40 | | | | | | | | | | | | |
| A7 | | | | | | | 40 | | | | | | | | | | | |
| A8 | | | | | | | | 40 | | | | | | | | | | |
| A9 | | | | | | | | | 40 | | | | | | | | | |
| A10 | | | | | | | | | | 40 | | | | | | | | |
| A11 | | | | | | | | | | | 40 | | | | | | | |
| A12 | | | | | | | | | | | | 40 | | | | | | |
| A13 | | | | | | | | | | | | | 40 | | | | | |
| B1 | | | | | | | | | | | | | | 40 | | | | |
| B2 | | | | | | | | | | | | | | | 40 | | | |
| B3 | | | | | | | | | | | | | | | | 40 | | |
| B4 | | | | | | | | | | | | | | | | | 40 | |
| C1 | | | | | | | | | | | | | | | | | | 40 |
| Cuprous oxide | 20 | 20 | 20 | 20 | 20 | 20 | 20 | 20 | 20 | 20 | 20 | 20 | 20 | 20 | 20 | 20 | 20 | 20 |
| Zinc oxide | 15 | 15 | 15 | 15 | 15 | 15 | 15 | 15 | 15 | 15 | 15 | 15 | 15 | 15 | 15 | 15 | 15 | 15 |
| Silica powder | 3 | 3 | 3 | 3 | 3 | 3 | 3 | 3 | 3 | 3 | 3 | 3 | 3 | 3 | 3 | 3 | 3 | 3 |
| Disperon 4200 | 1 | 1 | 1 | 1 | 1 | 1 | 1 | 1 | 1 | 1 | 1 | 1 | 1 | 1 | 1 | 1 | 1 | 1 |
| Xylene | 8 | 8 | 10 | 8 | 5 | 8 | 5 | 10 | 8 | 8 | 10 | 8 | 8 | 5 | 5 | 5 | 5 | 5 |

(Note) Disperon 4200 (made by Kusumoto Kasei K.K., anti-sagging agent)

TABLE 3

| | | Example | | | | | | | | | | | | | Comparative Example | | | |
|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 1 | 2 | 3 | 4 |
| Consumed coating thickness (μm) | 3 months | 16 | 28 | 8 | 16 | 32 | 35 | 28 | 15 | 18 | 19 | 13 | 30 | 52 | 3 | 4 | 17 | 4 |
| | 6 months | 30 | 53 | 14 | 29 | 56 | 63 | 51 | 25 | 34 | 33 | 23 | 55 | 95 | 5 | 6 | 18 | 4 |
| | 9 months | 48 | 79 | 21 | 43 | 82 | 90 | 75 | 35 | 51 | 47 | 32 | 79 | 137 | 8 | 9 | 18 | 4 |
| | 12 months | 64 | 106 | 25 | 56 | 108 | 115 | 100 | 44 | 68 | 60 | 40 | 104 | 181 | 10 | 12 | 18 | 4 |
| | 15 months | 81 | 130 | 32 | 71 | 137 | 144 | 127 | 55 | 85 | 76 | 52 | 130 | 222 | 14 | 16 | 18 | 4 |
| | 18 months | 96 | 152 | 37 | 84 | 161 | 170 | 141 | 64 | 100 | 90 | 61 | 154 | — | 17 | 19 | 18 | 4 |

TABLE 3-continued

|  |  | Example |  |  |  |  |  |  |  |  |  |  |  |  | Comparative Example |  |  |  |
|---|---|---|---|---|---|---|---|---|---|---|---|---|---|---|---|---|---|---|
|  |  | 1 | 2 | 3 | 4 | 5 | 6 | 7 | 8 | 9 | 10 | 11 | 12 | 13 | 1 | 2 | 3 | 4 |
|  | 21 months | 110 | 174 | 42 | 97 | 186 | 196 | 165 | 74 | 115 | 102 | 71 | 180 | — | 19 | 21 | 18 | 4 |
|  | 24 months | 123 | 197 | 46 | 110 | 210 | 221 | 188 | 82 | 131 | 124 | 80 | 203 | — | 21 | 24 | 18 | 4 |
| Monthly average of consumed coating thickness (μm) |  | 5.1 | 8.2 | 1.9 | 4.6 | 8.6 | 9.2 | 7.8 | 3.4 | 5.5 | 5.2 | 3.3 | 8.5 | 14.8 | 0.9 | 1.0 | 0.8 | 0.1 |

Note) In Example 13 the coating applied of about 240 μm was entirely consumed after 18 months.

TABLE 4

|  |  | Example |  |  |  |  |  |  |  |  |  |  |  |  | Comparative Example |  |  |  |
|---|---|---|---|---|---|---|---|---|---|---|---|---|---|---|---|---|---|---|
|  |  | 1 | 2 | 3 | 4 | 5 | 6 | 7 | 8 | 9 | 10 | 11 | 12 | 13 | 1 | 2 | 3 | 4 |
| Incrusted area (%) | 6 months | 0 | 0 | 0 | 0 | 0 | 0 | 0 | 0 | 0 | 0 | 0 | 0 | 0 | 0 | 0 | 10 | 70 |
|  | 12 months | 0 | 0 | 0 | 0 | 0 | 0 | 0 | 0 | 0 | 0 | 0 | 0 | 0 | 0 | 0 | 70 | 100 |
|  | 18 months | 0 | 0 | 0 | 0 | 0 | 0 | 0 | 0 | 0 | 0 | 0 | 0 | 0 | 0 | 0 | 100 | 100 |
|  | 24 months | 0 | 0 | 0 | 0 | 0 | 0 | 0 | 0 | 0 | 0 | 0 | 0 | 0 | 10 | 0 | 100 | 100 |
|  | 30 months | 0 | 0 | 0 | 0 | 0 | 0 | 0 | 0 | 0 | 0 | 0 | 0 | 0 | 30 | 30 | 100 | 100 |
|  | 36 months | 0 | 0 | 10 | 0 | 10 | 0 | 0 | 0 | 0 | 0 | 0 | 0 | 0 | 70 | 50 | 100 | 100 |

TABLE 5

|  |  |  | Example |  |  |  |  |  |  |  |  |  |  |  |  | Comparative Example |  |  |  |
|---|---|---|---|---|---|---|---|---|---|---|---|---|---|---|---|---|---|---|---|
|  |  |  | 1 | 2 | 3 | 4 | 5 | 6 | 7 | 8 | 9 | 10 | 11 | 12 | 13 | 1 | 2 | 3 | 4 |
| Crack and peel resistance | 6 months | A | ◉ | ◉ | ◉ | ◉ | ◉ | ◉ | ◉ | ◉ | ◉ | ◉ | ◉ | ◉ | ◉ | ◉ | ◉ | ◉ | ◉ |
|  |  | B | ○ | ○ | ○ | ◉ | ◉ | ◉ | ◉ | ◉ | ◉ | ◉ | ◉ | ◉ | ◉ | ○ | ○ | ○ | ◉ |
|  |  | C | ◉ | ◉ | ◉ | ◉ | ◉ | ◉ | ◉ | ◉ | ◉ | ◉ | ◉ | ◉ | ◉ | ◉ | ◉ | ◉ | ◉ |
|  | 12 months | A | ◉ | ◉ | ◉ | ◉ | ◉ | ◉ | ◉ | ◉ | ◉ | ◉ | ◉ | ◉ | ◉ | ◉ | ◉ | ○ | ◉ |
|  |  | B | ◉ | ◉ | ○ | △ | △ | ◉ | ◉ | ◉ | ◉ | ◉ | ◉ | ◉ | ◉ | ○ | × | × | ◉ |
|  |  | C | ○ | ○ | ○ | ○ | ○ | ◉ | ◉ | ◉ | ◉ | ◉ | ◉ | ◉ | ◉ | ◉ | ◉ | ◉ | ◉ |

What is claimed is:

1. An antifouling paint composition comprising, as a vehicle, a copolymer from a monomer mixture comprising of ($a_1$) a metal-containing polymerizable monomer having two unsaturated groups and ($a_2$) a metal-containing polymerizable monomer represented by the following formula (I):

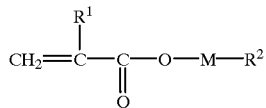

(I)

wherein $R^1$ represents a hydrogen atom or a methyl group; M represents Mg, Zn or Cu; and $R^2$ represents an organic acid residue.

2. An antifouling paint composition comprising, as a vehicle, a copolymer from a monomer mixture comprising (a) a metal-containing polymerizable monomer and (b) a polymerizable monomer represented by the following formula (II):

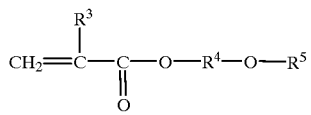

(II)

wherein $R^3$ represents a hydrogen atom or a methyl group; $R^4$ represents an alkyl group having 1 to 10 carbon atoms, a cycloalkyl group or a phenyl group; and $R^5$ represents an alkyl group having 1 to 10 carbon atoms, a cycloalkyl group or a phenyl group.

3. An antifouling paint composition according to claim 2, wherein the metal-containing polymerizable monomer (a) is a metal-containing polymerizable monomer ($a_1$) having two unsaturated groups.

4. An antifouling paint composition according to claim 2, wherein the metal-containing polymerizable monomer (a) is a metal-containing polymerizalbe monomer ($a_2$) represented by the formula (I):

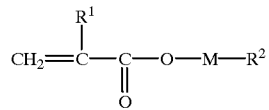
(I)

wherein $R^1$ represents a hydrogen atom or a methyl group; M represents Mg, Zn or Cu; and $R^2$ represents an organic acid residue.

5. An antifouling paint composition according to claim 2, wherein the metal-containing polymerizable monomer (a) is a mixture of ($a_1$) a metal-containing polymerizable monomer having two unsaturated groups and ($a_2$) a metal-containing polymerizable monomer represented by the formula (I).

* * * * *

UNITED STATES PATENT AND TRADEMARK OFFICE
CERTIFICATE OF CORRECTION

PATENT NO.   : 6,177,530 B1
DATED        : January 23, 2001
INVENTOR(S)  : Sugihara et al.

It is certified that error appears in the above-identified patent and that said Letters Patent is hereby corrected as shown below:

Column 5,
Line 27, change "$\hat{a}$" to -- $\gamma$ -- and change "$\dot{a}$" to -- $\varepsilon$ --.

Line 41, change "á" to -- $\alpha$ --.

Signed and Sealed this

Thirty-first Day of August, 2004

JON W. DUDAS
*Director of the United States Patent and Trademark Office*